Oct. 10 1967  H. FINKEL ET AL  3,345,714
CLIP FASTENER
Filed Feb. 1, 1966
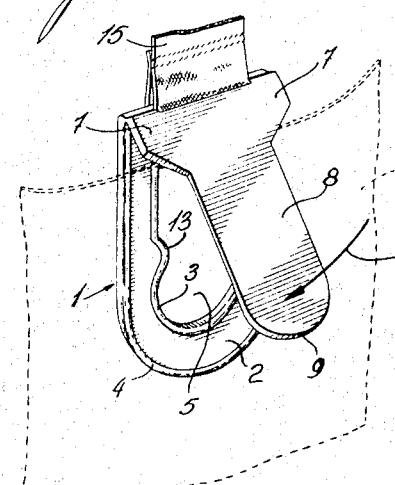
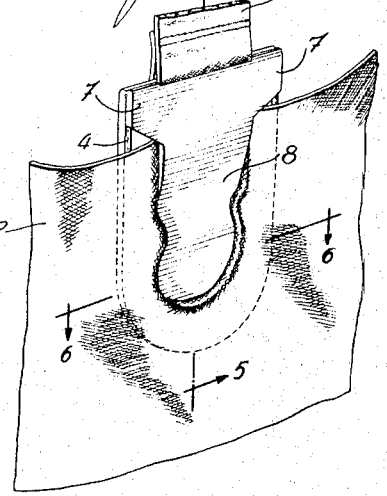
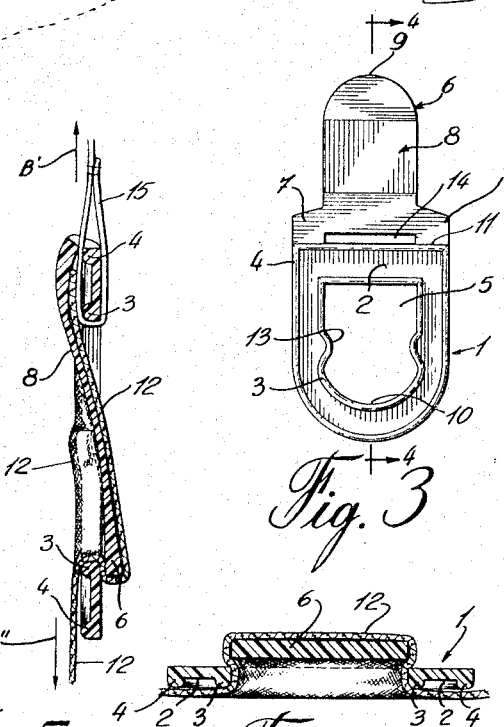
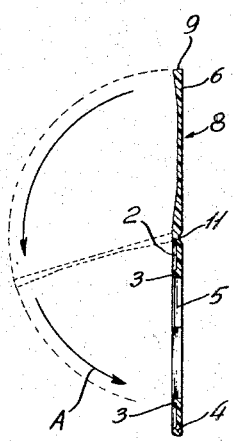
INVENTORS
Henry FINKEL
Lewis WAXMAN
BY
ATTORNEYS

United States Patent Office 3,345,714
Patented Oct. 10, 1967

3,345,714
CLIP FASTENER
Henry Finkel, Westmount, Quebec, Canada, and Lewis
Waxman, 810 101st Ave., Laval, Quebec, Canada, said
Finkel assignor to said Waxman
Filed Feb. 1, 1966, Ser. No. 524,218
1 Claim. (Cl. 24—246)

The invention disclosed hereinafter relates to fasteners and, particularly, to the class of fasteners commonly referred to as clips; clips being fasteners which are intended for securing together sheets of materials and/or fabric.

Fasteners of the same general category as that of the invention have wide usefulness; for instance, they are commonly used for holding garments such as stockings or, in braces. Characteristically, the clip of the invention may be useful for binding together a plurality of sheets in the manner of a paper clip and/or for bridging the gap between two pieces of material.

The clip of the invention is intended as a means for fastening or binding together several layers of sheet material by pinching several layers of same in frictional contact with each other.

It is found that fasteners of the same class as that of the fastener of the invention are often used in garments and apparels and are, therefore, in constant direct or indirect contact with portions of the body of the wearer. It is also found that in many such instances, the wearers have suffered skin irritations and/or injuries which resulted therefrom.

It is a very important object and advantage of the present invention that it provides a clip which is very light and pliable and will not result in any skin irritation or injury to the user but, nevertheless, shows excellent retaining power.

Furthermore, the pliability of the material from which the clip of the invention is made contributes in giving it excellent though not excessive retaining power and therefore, making it safer for use in wearing apparels in which the risk of injury to the wearer would preclude the use of clips made of a more rigid material and/or clips which can afford a more positive grip on the material. It can therefore be said that the clip of the present invention offers a built-in safety release factor not normally encountered in other clips of its kind.

The clip of the present invention is therefore particularly intended as an improved substitute for the conventional pins such as diaper pins which are used in instances where it is necessary to bind together two or more thicknesses of material and/or where it is wished to hold same from falling.

For instance, the clip of the invention is conveniently used in diaper tabs for securing the diaper of an infant to his vest. It can also be variously used in connection with foundation undergarments for holding stockings or, in sanitary belts.

The new clip for garment essentially comprises a plane frame which defines an aperture, a tab integrally connected to the said frame and projecting outwardly therefrom, said tab being flexibly hinged on said frame through a thinned out portion at the line along which said tab is connected to said frame. The tab has a profile which generally matches that of the aperture in the frame so that, upon folding the tab over the frame, along the flexible hinge line, the end portion thereof may be pressed through the aperture.

The aforementioned and other advantages and objects of the invention will be better understood and appreciated from the following disclosure of a preferred embodiment thereof.

In the drawing:

FIG. 1 is a perspective view of a clip in accordance with the present invention; the clip being shown in an unlocked attitude;

FIG. 2 is a perspective view of the same, wherein the clip is shown in locked attitude over a piece of flexible sheet material;

FIG. 3 is a plan view of a basic clip in accordance with the present invention;

FIG. 4 is a sectional view taken along line 4—4 of FIG. 3;

FIG. 5 is a sectional view taken along line 5—5 of FIG. 2; and

FIG. 6 is a cross-sectional view taken along line 6—6 of FIG. 2.

The clip shown in the drawings is made of any suitably pliable material and preferably of a plastic. Among the plastics, some of the more inexpensive ones such as polyethylene and polypropylene have been found highly suitable.

The clip comprises a plane fram 1 presenting a surface 2 and a U-shaped aperture 5. The surface 2 is defined by a circumferential reinforcing bead 3 around the aperture 5, an external beaded edge 4 and a shallow groove 11 disposed transversely between the ends of the beaded edge 4. It should be obvious to the reader that the frame 1 could also be made of a somewhat thicker material in order to avoid the necessity for providing bead 3 and/or beaded edge 4, both of which act as stiffeners. It should be noted that the groove 11 is preferably located on the reverse side of the frame 1 with respect to the surface 2 thereof.

A tab 9 is integrally connected to the frame 1 and extends outwardly therefrom along groove line 11. There is a slotted hole 14 in the tab and adjacent to the groove line 11; shoulders 7 linking the said tab 9 to the frame 1 beyond each end of the slotted hole 14.

The tab 9 is generally U-shaped beyond its shoulders 7 and presents a profile which matches but is the mirror image of the profile of the aperture 5; exception being made for opposed lateral indentations 13 which are observed in the aperture 5 but do not find their counterpart in the profile of the tab 9.

The tab 9 has a semi-circular tip portion 6, a central portion 8 and the base or shoulder portion 7. The material within the central portion 8 is preferably thinner and therefore possesses greater flexibility than the material in the tip portion 6 or in the shoulder portion 7. Within the semi-circular tip 6 and the shoulder portion 7, the thickness of the material is progressively increased from the boundaries thereof with central portion 8 outward, as may be observed in FIG. 4.

When used for suspension, the clip of the invention is preferably secured to a suspension strap or ribbon 15 through an end loop thereof which runs through the longitudinal slot 14 from the rear, extends downwardly over the surface 2 and then projects through the aperture 5 from the front.

The manner in which the clip itself operates is as follows: the edge of the sheet material to be secured to the clip or the edges of the material to be bound thereby are applied over the frame 1 so as to cover all or most of the aperture 5 thereof; the tab 9 is then folded and applied over the material by bending along the flexible hinge line defined by groove 11; through application of finger pressure near the semi-circular end portion 6 of the tab, as shown by arrow A in FIG. 1, the tab is caused to deform sufficiently to pass through aperture 5, the material 12 being entrained in this movement.

The securing action of the clip is assured primarily by the wedging effect of that part of the material which passes around the tab and therefore closes or tightens the clearance gap between the profile of the tab and the corresponding profile of the aperture 5. However, in many instances, the aforementioned wedging effect would not be sufficient to provide the required grip on the material; therefore, the invention contemplates the use of at least one pair of opposed indentations 13 the effect of which is to enhance the retaining power resulting from the aforementioned wedging effect, by preventing return passage of the tab 9 without an incident strong degree of deformation of the tab itself.

To further improve the holding power of the clip, the invention also contemplates a clip wherein the tab when folded over the aperture 5 will present a perceptible degree of end overlap. The effect of the end overlap in improving the holding power of the clip 5 may be visualized in FIG. 5 wherein it will be observed and understood that when attempting to pull the clip and the material apart, such as by pulling in the directions of arrows B′ and B″, the effect of the tension will be to promote a reduction of the overlap or backing up of the tab tip portion 6 with resultant further arching of the tab and particularly of the thin central portion 8 thereof. Such arching taking place about a transverse axis, it necessarily has the effect of further increasing the apparent stiffness of the tab and, therefore, its ability to resist the forces which tend to cause deformation thereof about a vertical axis; the reader will appreciate that deformation of the tab about a vertical axis is necessary in order to allow passage thereof between the indentations 13.

In cases where clips of the invention are intended for repeated and prolonged usage, particular care should be taken to select a material capable of sustaining, without fatigue, the stresses arising from the rather severe and repeated folding of the tab along the flexible hinge line 11. Excellent fatigue resistance of this nature is manifested by many grades of polypropylene as well as by several other commercially available plastics; polypropylene being the most economical.

We claim:

A one piece clip for a garment comprising an elongated frame surrounding an aperture having substantially parallel elongated sides joined by a rounded bottom of substantially arcuate configuration consisting of a plastic wall surrounded by an internal and an external bead, an internal substantially arcuate protuberance on each side of the long side of the frame opposite each other, aligned with each other and projecting towards each other a resilient tab integrally connected to the frame and extending therefrom, the said tab having a width substantially matching but slightly less than the width of the aperture and adapted to be snapped past the protuberances to grip a portion of a garment therebetween and there being a slot centrally located between the frame and the tab for engagement by a strap on the garment to suspend the clip therefrom.

References Cited

UNITED STATES PATENTS

| 824,332 | 6/1906 | Barnum | 24—246 |
| 2,624,093 | 1/1953 | Hatch et al. | 24—246 |
| 3,224,063 | 12/1965 | Jonas | 24—245 |

FOREIGN PATENTS

| 17,705 | 1905 | Great Britain. |
| 417,347 | 10/1934 | Great Britain. |
| 1,279,412 | 11/1961 | France. |

WILLIAM FELDMAN, *Primary Examiner.*

DONALD A. GRIFFIN, *Examiner.*